United States Patent
Yang

(10) Patent No.: US 11,006,440 B2
(45) Date of Patent: May 11, 2021

(54) METHOD FOR TRANSMITTING/RECEIVING SIGNALS, AND DEVICE FOR SAME

(71) Applicant: LG ELECTRONICS INC., Seoul (KR)

(72) Inventor: Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 16/069,433

(22) PCT Filed: Jan. 13, 2017

(86) PCT No.: PCT/KR2017/000503
§ 371 (c)(1),
(2) Date: Jul. 11, 2018

(87) PCT Pub. No.: WO2017/123064
PCT Pub. Date: Jul. 20, 2017

(65) Prior Publication Data
US 2019/0029032 A1  Jan. 24, 2019

Related U.S. Application Data

(60) Provisional application No. 62/278,997, filed on Jan. 15, 2016.

(51) Int. Cl.
*H04L 5/00* (2006.01)
*H04W 72/04* (2009.01)
(Continued)

(52) U.S. Cl.
CPC ........... *H04W 72/1284* (2013.01); *H04L 1/18* (2013.01); *H04L 1/1812* (2013.01);
(Continued)

(58) Field of Classification Search
CPC .... H04L 5/001; H04L 5/003; H04W 72/1284; H04W 72/0446; H04W 72/1289
See application file for complete search history.

(56) References Cited

U.S. PATENT DOCUMENTS

| | | | | |
|---|---|---|---|---|
| 9,763,197 | B2 * | 9/2017 | Damnjanovic | H04W 52/08 |
| 2012/0057547 | A1 * | 3/2012 | Lohr | H04W 52/34 |
| | | | | 370/329 |

(Continued)

FOREIGN PATENT DOCUMENTS

| | | |
|---|---|---|
| KR | 10-2015-0105353 A | 9/2015 |
| WO | WO 2013/155705 A1 | 10/2013 |

OTHER PUBLICATIONS

Nokia Networks et al., "Revised WID: LTE Carrier Aggregation Enhancement Beyond 5 Carriers," 3GPP TSG RAN Meeting #70, RP-151984, Sitges, Spain, Dec. 7-10, 2015, 11 pages.

(Continued)

*Primary Examiner* — Kevin C. Harper
(74) *Attorney, Agent, or Firm* — Birch, Stewart, Kolasch & Birch, LLP

(57) ABSTRACT

The present invention relates to a wireless communication system. In particular, the present invention provides a method for transmitting uplink signals in a wireless communication system, which supports carrier aggregation, and a device for same, the method comprising the steps of: configuring multiple cells having different subframe configurations; transmitting, in a first cell of subframe #n, first control information through a first PUCCH; and transmitting, in a second cell of subframe #m, second control information through a second PUCCH, wherein: the first cell is a cell the transmission direction of which is configured as an uplink in subframe #n; the second cell is a cell the transmission direction of which is configured as an uplink in (Continued)

* The first cell is a cell wherein a transmission direction is configured as uplink in the subframe #n,
the second cell is a cell wherein a transmission direction is configured as uplink in the subframe #m,
and the first cell is different from the second cell.

subframe #m; and the second cell is different from the first cell.

14 Claims, 12 Drawing Sheets

(51) Int. Cl.
    *H04W 72/12*     (2009.01)
    *H04L 5/14*     (2006.01)
    *H04L 1/18*     (2006.01)
    *H04W 72/14*     (2009.01)

(52) U.S. Cl.
    CPC ............ *H04L 1/1854* (2013.01); *H04L 5/001* (2013.01); *H04L 5/003* (2013.01); *H04L 5/0055* (2013.01); *H04L 5/0091* (2013.01); *H04L 5/1469* (2013.01); *H04W 72/0446* (2013.01); *H04W 72/1289* (2013.01); *H04L 5/0023* (2013.01); *H04W 72/14* (2013.01)

(56) References Cited

U.S. PATENT DOCUMENTS

| | | | | |
|---|---|---|---|---|
| 2012/0263087 | A1* | 10/2012 | Aiba ................... | H04B 1/7087 370/311 |
| 2013/0028205 | A1* | 1/2013 | Damnjanovic ......... | H04L 5/001 370/329 |
| 2013/0242814 | A1 | 9/2013 | Wang et al. | |
| 2015/0009872 | A1* | 1/2015 | Yang ........................ | H04J 3/00 370/280 |
| 2015/0319753 | A1* | 11/2015 | Chen ...................... | H04L 5/001 370/277 |

OTHER PUBLICATIONS

NTT Docomo, Inc. et al., "Work Plan for LTE Carrier Aggregation Enhancement Beyond 5 Carriers," 3GPP TSG-RAN #66, RP-141997, Maui, USA, Dec. 8-11, 2014, pp. 1-5 (6 pages total).

* cited by examiner

HARQ processes in UL-DL configuration #1

- PCell group: PCell (UD-cfg a)
- SCell group: ACell (UD cfg b), SCell (UD-cfg c)

* UD-cfg a ≠ UD-cfg b
* For SCell of SCell group, DL ref-cfg is determined in consideration of DL union of PCell and ACell, and UL ref-cfg is determined in consideration of UL superset of PCell and ACell.

METHOD FOR TRANSMITTING/RECEIVING SIGNALS, AND DEVICE FOR SAME

CROSS REFERENCE TO RELATED APPLICATIONS

This application is the National Phase of PCT/KR2017/000503 filed on Jan. 13, 2017, which claims priority under 35 U.S.C. § 119(e) to U.S. Provisional Application No. 62/278,997 filed on Jan. 15, 2016, all of which are hereby expressly incorporated by reference into the present application.

TECHNICAL FIELD

The present invention relates to a wireless communication system, and more specifically, to a method for transmitting/receiving a signal in a multicarrier system and a device for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

An object of the present invention devised to solve the problem lies in a method for efficiently transmitting/receiving a signal in a wireless communication system and a device for the same. Another object of the present invention is to provide a method for efficiently transmitting/receiving a signal in a multicarrier system and a device for the same.

The technical problems solved by the present invention are not limited to the above technical problems and those skilled in the art may understand other technical problems from the following description.

Technical Solution

In one aspect of the present invention, a method for transmitting uplink signals by a UE in a wireless communication system supporting carrier aggregation includes: configuring multiple cells having different subframe configurations; transmitting, in a first cell of subframe #n, first control information through a first physical uplink control channel (PUCCH); and transmitting, in a second cell of subframe #m, second control information through a second PUCCH, wherein the first cell is a cell in which a transmission direction is configured as uplink in subframe #n and the second cell is a cell in which a transmission direction is configured as uplink in subframe #m, the second cell being different from the first cell.

In another aspect of the present invention, a UE configured to transmit uplink signals in a wireless communication system supporting carrier aggregation includes: a radio frequency (RF) unit; and a processor, wherein the processor is configured to configure multiple cells having different subframe configurations, to transmit, in a first cell of subframe #n, first control information through a first physical uplink control channel (PUCCH) and to transmit, in a second cell of subframe #m, second control information through a second PUCCH, wherein the first cell is a cell in which a transmission direction is configured as uplink in subframe #n and the second cell is a cell in which a transmission direction is configured as uplink in subframe #m, the second cell being different from the first cell.

Preferably, when there is a single cell in which a transmission direction is configured as uplink in subframe #n, the first control information may include only uplink control information about the single cell and, when there are multiple cells in which a transmission direction is configured as uplink in subframe #n, the first control information may include uplink control information about the multiple cells.

Preferably, when there is a single cell in which a transmission direction is configured as uplink in subframe #n, the first PUCCH may be transmitted on the single cell and, when there are multiple cells in which a transmission direction is configured as uplink in subframe #n, the first PUCCH may be transmitted on a specific one of the multiple cells.

Preferably, the specific cell may be a cell having the lowest cell index among the multiple cells when there are multiple cells in which a transmission direction is configured as uplink in subframe #n.

Preferably, when there is a single cell in which a transmission direction is configured as uplink in subframe #n, a downlink grant which schedules the cell may include power control information for the first PUCCH.

Preferably, when there are multiple cells in which a transmission direction is configured as uplink in subframe #n, a downlink grant which schedules the specific cell may include power control information for the first PUCCH and a downlink grant which schedules cells other than the specific cell among the multiple cells may include information indicating a resource of the first PUCCH.

Preferably, the first control information and the second control information may include hybrid ARQ acknowledgement (HARQ-ACK) information.

Advantageous Effects

According to the present invention, a signal can be efficiently transmitted/received in a wireless communication system. Furthermore, a signal can be efficiently transmitted/received in a multicarrier system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
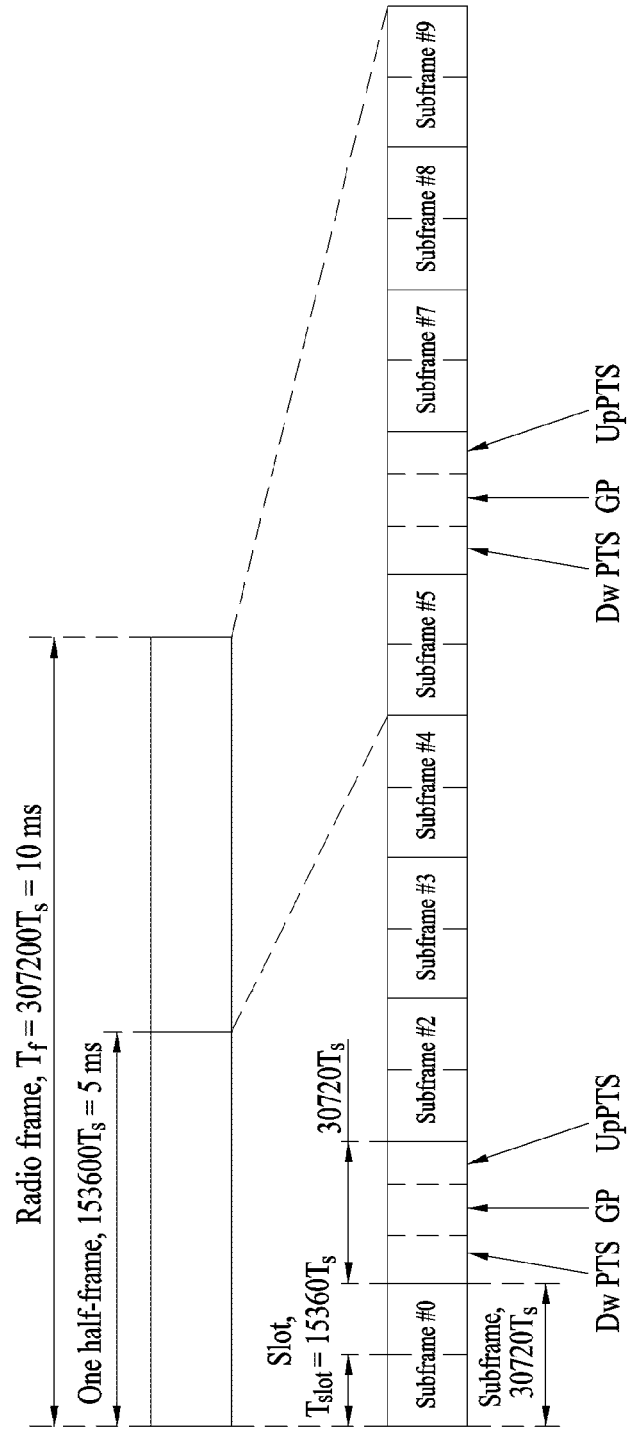
FIG. 1 illustrates a radio frame structure.

FIG. 1 illustrates a radio frame structure.

Referring to FIG. 1, a radio frame used in 3GPP LTE(-A) has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band.

Particularly, FIG. 1 shows a radio frame structure for TDD, used in 3GPP LTE(-A). Table 1 shows UL-DL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |

TABLE 2-continued

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 7 | $21952 \cdot T_s$ | | | — | — | — |
| 8 | $24144 \cdot T_s$ | | | — | — | — |

Figure 2:
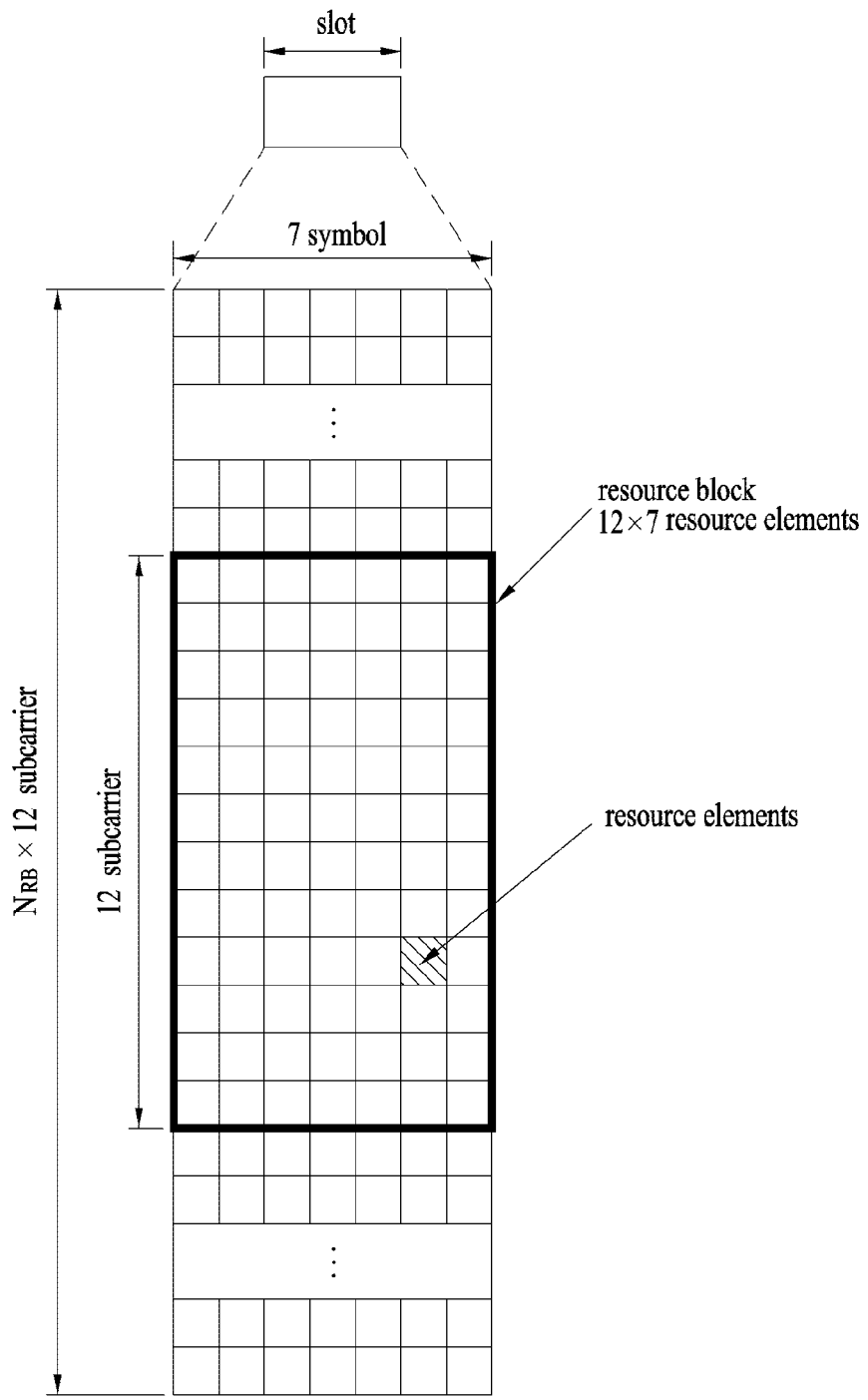
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
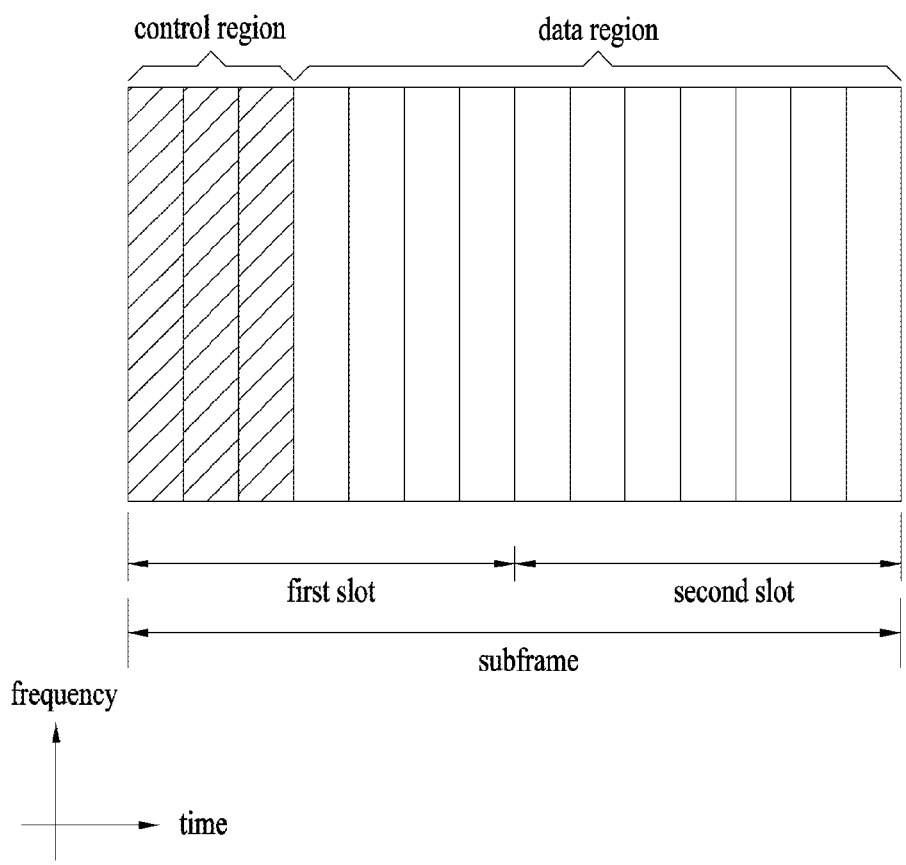
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals
DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
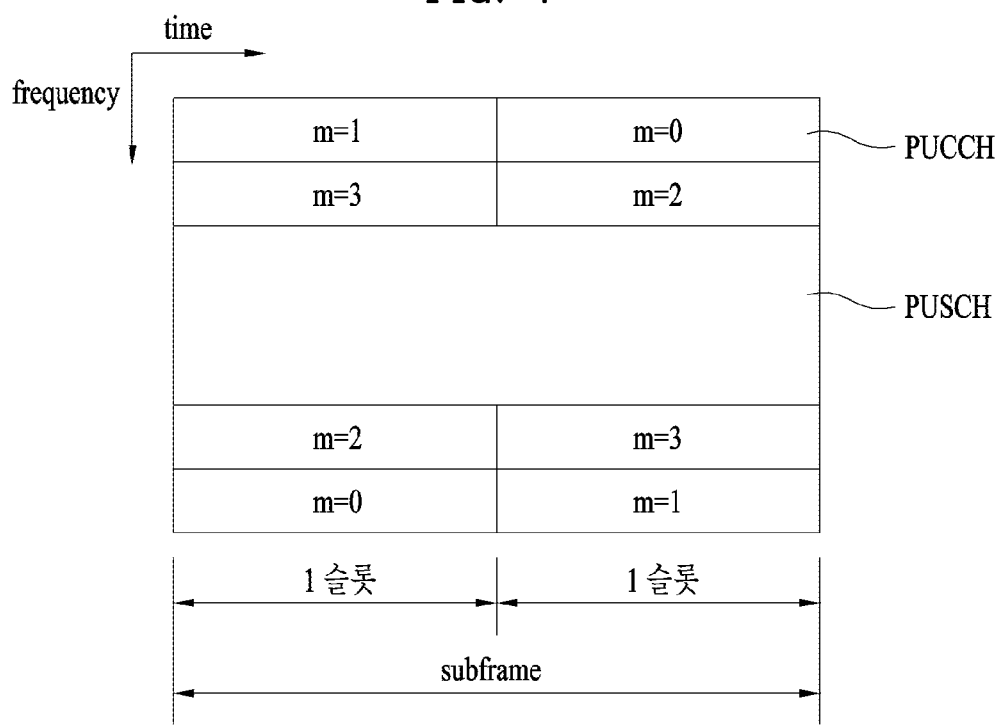
FIG. 4 illustrates an uplink subframe structure.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE(-A).

TABLE 3

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 11.

Figure 5:
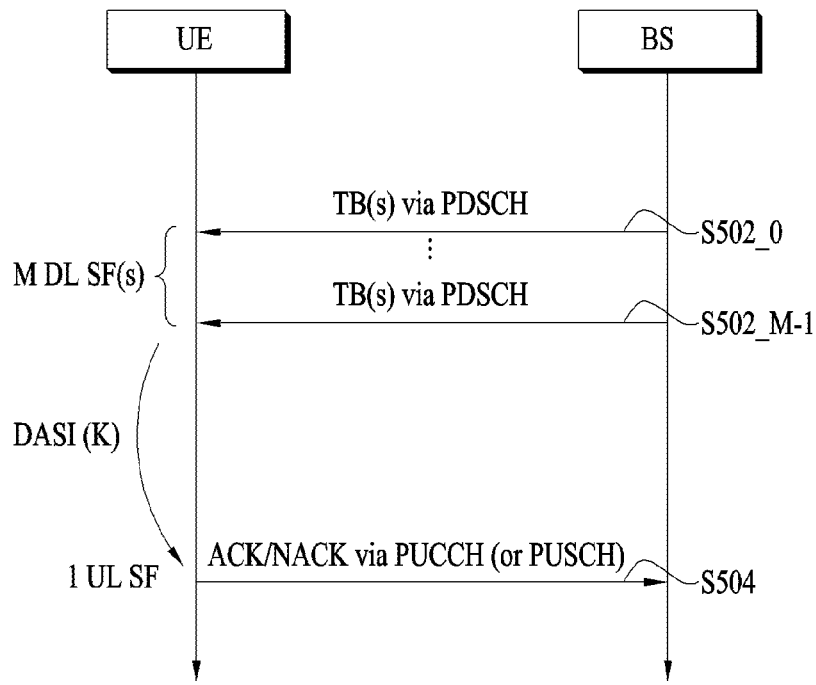
FIGS. 5 and 6 illustrate TDD UL ACK/NACK (Uplink Acknowledgement/Negative Acknowledgement) transmission timing in a single cell case.
Figure 6:
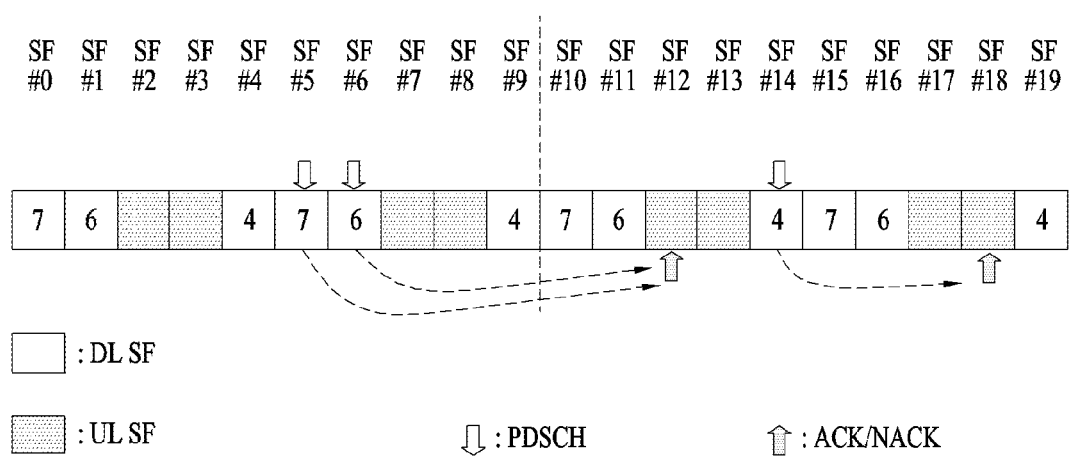

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, k−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Config- uration | Subframe n | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 6 illustrates UL ACK/NACK transmission timing when UL-DL configuration #1 is configured. In the figure, SF #0 to #9 and SF #10 to #19 respectively correspond to radio frames, and numerals in blocks denote UL subframes relating to DL subframes. For example, ACK/NACK for a PDSCH of SF #5 is transmitted in SF #5+7 (=SF #12) and ACK/NACK for a PDSCH of SF #6 is transmitted in SF #6+6 (=SF #12). Accordingly, both ACKs/NACKs for DL signals of SF #5/#6 are transmitted in SF #12. Similarly, ACK/NACK for a PDSCH of SF #14 is transmitted in SF #14+4 SF #18).

Figure 7:
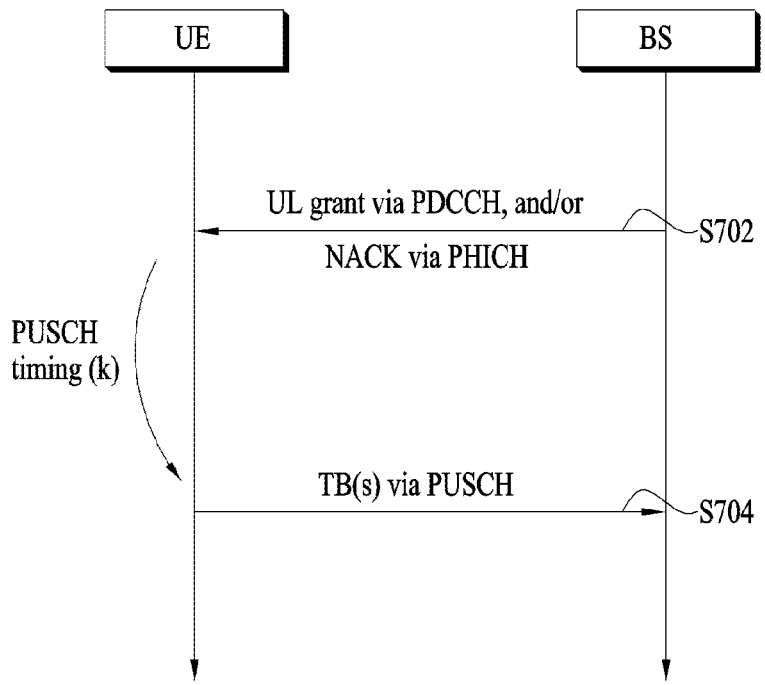
FIGS. 7 and 8 illustrate TDD PUSCH (Physical Uplink Shared Channel) transmission timing in a single cell case.
Figure 8:
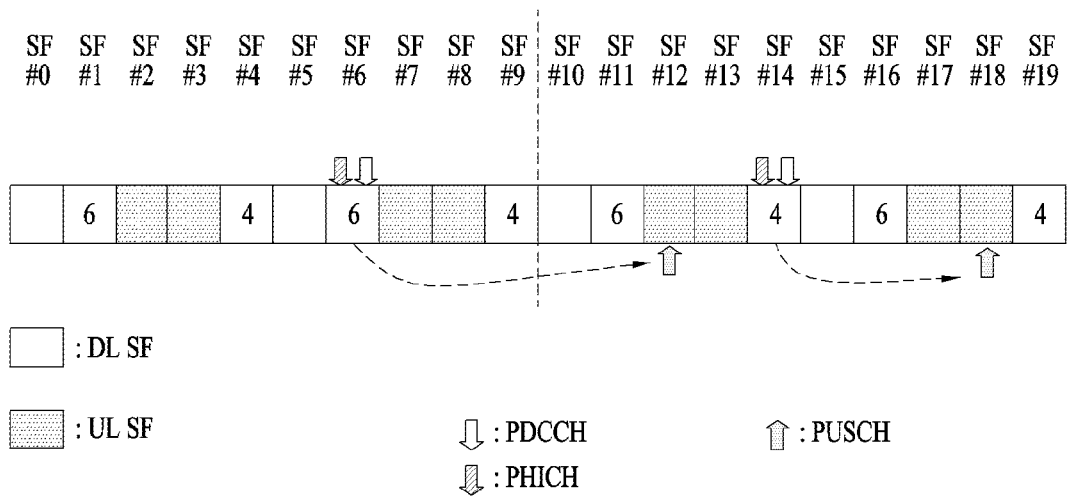

FIGS. 7 and 8 illustrate PHICH grant-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 8 illustrates PUSCH transmission timing when UL-DL configuration #1 is configured. In the figure, SF #0 to #9 and SF #10 to #19 respectively correspond to radio frames, and numerals in blocks denote UL subframes relating to DL subframes. For example, a PUSCH corresponding to PHICH/UL grant of SF #6 is transmitted in SF #6+6 (=SF #12) and a PUSCH corresponding to a PHICH/UL grant of SF #14 is transmitted in SF #14+4 (=SF #18).

Figure 9:
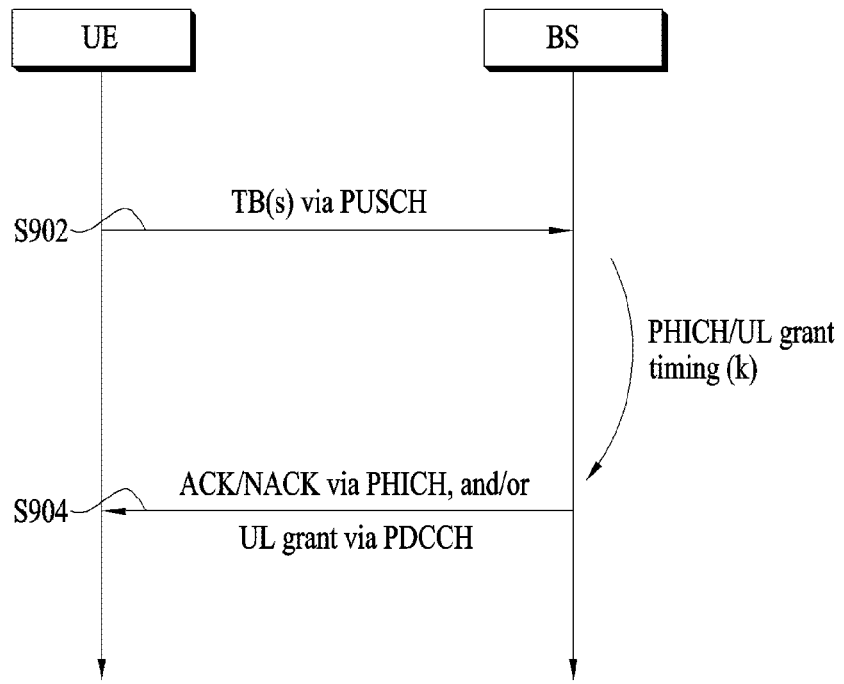
FIGS. 9 and 10 illustrate TDD DL ACK/NACK transmission timing in a single cell case.
Figure 10:
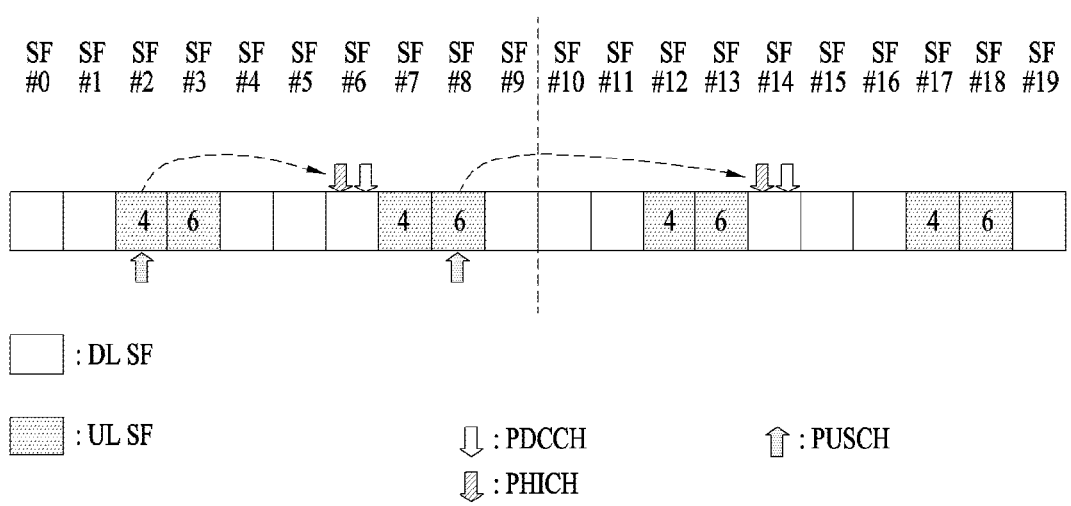

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i–k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 10 illustrates PHICH/UL grant transmission timing when UL-DL configuration #1 is configured. In the figure, SF #0 to #9 and SF #10 to #19 respectively correspond to radio frames, and numerals in blocks denote DL subframes relating to UL subframes. For example, a PHICH/UL grant corresponding to a PUSCH of SF #2 is transmitted in SF #2+4 (=SF #6) and a PHICH/UL grant corresponding to a PUSCH of SF #8 is transmitted in SF #8+6 SF #14).

PHICH resource allocation will now be described. When a PUSCH is transmitted in subframe #n, the UE determines a PHICH resource corresponding to the PUSCH in subframe #(n+$k_{PHICH}$). In case of FDD, $k_{PHICH}$ has a fixed value (e.g. 4). In case of TDD, $k_{PHICH}$ has a value depending on UL-DL configuration. Table 7 shows $k_{PHICH}$ for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

The number of UL HARQ processes varies. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 11:
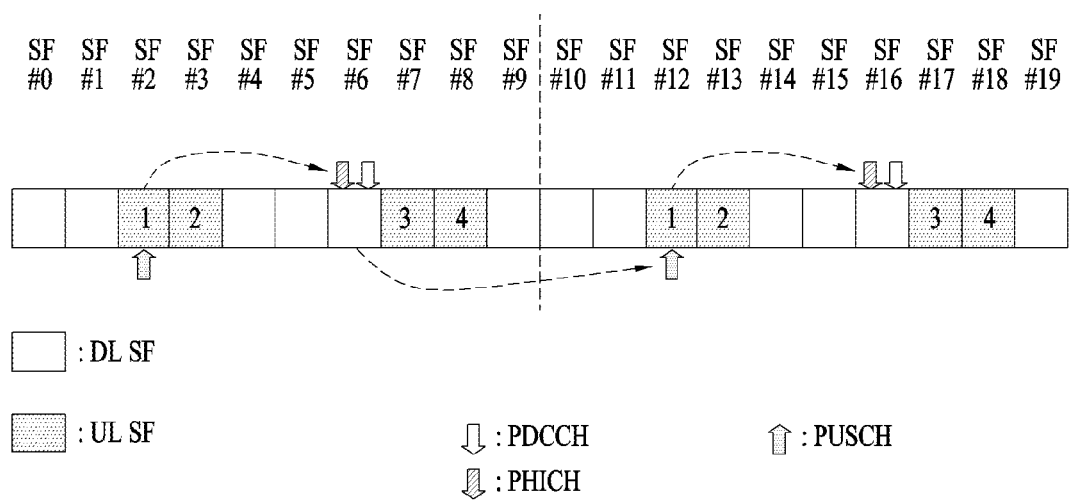
FIG. 11 illustrates a TDD HARQ (Hybrid Automatic Repeat request) process in a single cell situation.

FIG. 11 illustrates a synchronous UL HARQ process when UL-DL configuration #1 is configured. Numerals in blocks denote UL HARQ process numbers. The synchronous UL HARQ process shown in FIG. 11 corresponds to a normal HARQ process. Referring to FIG. 11, HARQ process #1 involves SF #2, SF #6, SF #12 and SF #16. For example, if an initial PUSCH signal (e.g. RV=0) is transmitted in SF #2, a UL grant PDCCH and/or a PHICH corresponding to the PUSCH signal can be received in SF #6 and a (retransmission) PUSCH signal (e.g. RV=2) corresponding to the initial PUSCH signal can be transmitted in SF #12. Accordingly, 4 UL HARQ processes having an RTT (Round Trip Time) of 10 SFs (or 10 ms) are present in case of UL-DL configuration #1.

Figure 12:
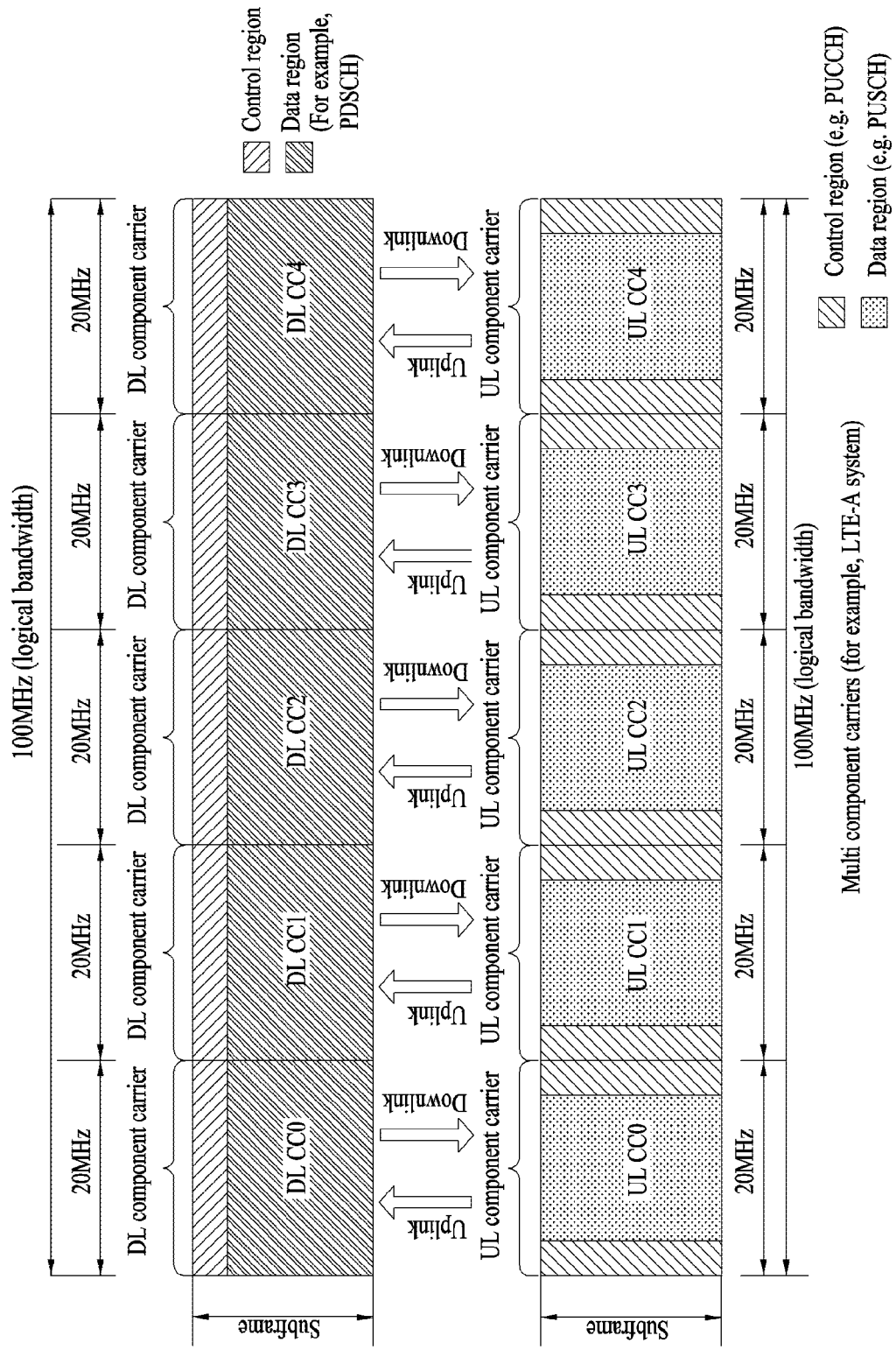
FIG. 12 illustrates a carrier aggregation (CA) communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not configured or which does not support CA. On the other hand, one or more serving cells exist, including a PCell and entire SCells, for a UE in an RRC_CONNECTED state, for which CA is configured. For CA, a network may configure one or more SCells in addition to an initially configured PCell, for a UE supporting CA during connection setup after an initial security activation operation is initiated.

Figure 13:
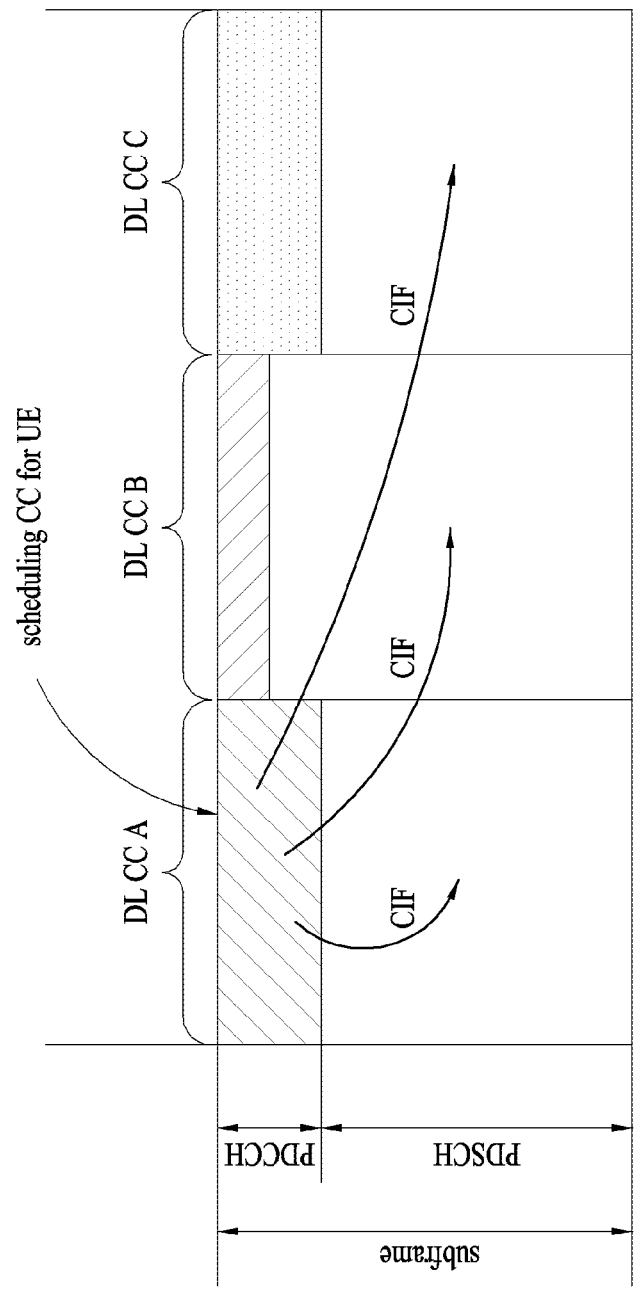
FIG. 13 illustrates scheduling in case of aggregation of a plurality of carriers.

FIG. 13 illustrates scheduling when a plurality of carriers is aggregated. It is assumed that 3 DL CCs are aggregated and DL CC A is configured as a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC (or MCC) interchangeably. A CC (or cell) in which a PDSCH/PUSCH is scheduled by a PDCCH of another CC is called a scheduled CC (or scheduled cell). One or more scheduling CCs may be configured for one UE and one of the scheduling CCs may be used for DL control signaling and UL PUCCH transmission. That is, a scheduling CC includes a PCC. When only one scheduling CC is configured, the scheduling CC corresponds to the PCC. The scheduling CC/scheduled CC may also be called MCC/SCC in the following description.

When cross-CC scheduling is configured, CCs carrying signals are defined according to signal type as follows.

PDCCH (UL/DL grant): scheduling CC (or MCC)
PDSCH/PUSCH: CC indicated by a CIF of a PDCCH, detected from a scheduling CC
DL ACK/NACK (e.g. PHICH): scheduling CC (or MCC) (e.g. DL PCC)
UL ACK/NACK (e.g. PUCCH): UL PCC
Embodiment: A/N Transmission when CCs Having Different Subframe Configurations are Aggregated At present, Rel-10/11/12 based LTE-A can support CA of a maximum of 5 cells/carriers (commonly referred to as cells hereinafter) for a single UE, a PUCCH which carries UCI (e.g., HARQ-ACK, CSI and the like) associated with corresponding multiple cells is transmitted through only a single PCell. Future systems may be designed to support CA of 5 or more cells for a single UE for the purpose of a higher data transmission rate. In this case, introduction of a new PUCCH format capable of supporting a payload larger than that of the conventional PUCCH format (e.g., PUCCH format 3) may be considered according to UCI size increase (due to increase in the number of cells constituting CA). In addition, to mitigate UCI transmission frequency/size increases (due to increase in the number of cells constituting CA) and PUCCH resource burden in a PCell due to the UCI transmission frequency/size increases, a method of configuring a specific SCell to transmit a PUCCH (UCI through the PUCCH) (in addition to PCells) may be considered. An SCell configured to transmit a PUCCH is referred to as ACell (anchor cell) for convenience, but it may be referred to by other terms.

Meanwhile, in conventional CA, a method based on PUCCH format 1b with channel selection (referred to as CHsel hereinafter) or PUCCH format 3 (referred to as PF3 hereinafter) may be set as a HARQ-ACK (referred to as A/N) feedback transmission method. CHsel, which is applicable to CA of two cells, is a method of selecting/modulating a specific one of a plurality of PUCCH format 1b (PF1) resources according to A/N combination corresponding to each cell, that is, A/N state with respect to CA and transmitting the selected/modulated resource. Specifically, when cross-CC scheduling is set (such as an SCell is scheduled form a PCell), all (CHsel candidate) PF1 resources corresponding to each cell may be allocated to implicit PUCCH resources linked to a DL grant transmission resource (e.g., (E)CCE). When cross-CC scheduling is not set, resources corresponding to a PCell is allocated to implicit PF1 whereas resources corresponding to an SCell may be allocated to a specific one (e.g., indicated by an ACK/NACK resource indicator (ARI) in a DL grant which schedules the SCell) of a plurality of preset explicit PF1 (sets) through a higher layer signal (e.g., radio resource control (RRC) signal).

On the other hand, PF3, which is applicable to CA of up to 5 cells, is a method of configuring A/N (bits) corresponding to each cell as a payload and mapping/transmitting coded bits generated through a coding (e.g., Reed Miller (RM) coding) process to/on PF3 resources. In this case, a PF3 resource used for A/N transmission may be allocated to a specific one (e.g., indicated by an ARI in a DL grant which schedules an SCell) of a plurality of (pre)set PF3 resources through a higher layer signal (e.g., RRC) (irrespective of whether cross-CC scheduling is set). Specifically, even though PF3 has been set for A/N transmission, when scheduling has been performed only for a PCell (in the case of FDD) or one SF (in the case of TDD) in the PCell (i.e., a DL grant has been detected), only A/N corresponding to the scheduling may be transmitted using implicit PF1 linked to the DL grant (this operation is referred to as fallback) and A/N for all cells constituting CA may be transmitted using PF3 indicated by an ARI in other cases.

In a situation in which a single UE aggregates (e.g., CA) a plurality of cells, simultaneous transmission and reception in the plurality of cells may not be allowed or may be impossible due to hardware configuration of the UE or indication from an eNB. Accordingly, when SFs (referred to as collided SFs hereinafter) having different transmission directions between cells collide at the same time, SFs of a plurality of cells may be configured in such a manner that SFs of a specific cell or a specific transmission direction is prioritized. For example, when multiple cells having different UL-DL configurations are aggregated, simultaneous transmission and reception may be limited. In this case, in 3GPP standard, SFs (i.e., transmission direction) on a PCell are prioritized such that 1) all UL signal transmissions may be limited/dropped in an SCell when D of the PCell and U or S of the SCell collide, 2) all DL signal receptions may be limited/dropped in the SCell when U of the PCell and D of the SCell collide and 3) only reception of conventional control channels such as PCFICH/PHICH/PDCCH signals may be allowed and reception of PDSCH/EPDCCH/PMCH/PRS signals may be limited/dropped in the SCell when S of the PCell and D of the SCell collide (referred to as HD (Half-Duplex)-TDD CA or HD operation hereinafter).

Method 1: HARQ-ACK Timing

In the case of an SCell in CA of cells having different UD-cfgs, a PDSCH scheduling related DL HARQ timing (e.g., an interval between PDSCH reception and HARQ- ACK transmission therefor) (refer to FIGS. 5 and 6 and Table 4) and a PUSCH scheduling related UL HARQ timing (e.g., an interval between UL grant reception and PUSCH transmission corresponding thereto (refer to FIGS. 7 and 8 and Tables 5 and 6), an interval between PUSCH transmission and PHICH and (retransmission) UL grant reception corresponding thereto (refer to FIGS. 9 and 10 and Table 7)) are set to conform to a HARQ timing defined in reference UD-cfg (referred to as ref-cfg hereinafter). Specifically, in the case of the SCell, a DL HARQ timing is set to conform to a HARQ timing defined in DL ref-cfg and a UL HARQ timing is set to conform to a HARQ timing defined in UL ref-cfg. In the case of a PCell, a DL/UL HARQ timing set in UD-cfg is used.

DL ref-cfg for SCells may be set to (i) UD-cfg (having the smallest number of DL SFs) including a DL SF union of a PCell and a corresponding SCell when cross-CC scheduling is not set and (ii) UD-cfg of the PCell when cross-CC scheduling is set. UL ref-cfg for SCells may be set to (i) UD-cfg of a corresponding SCell when cross-CC scheduling is not set and (ii) UD-cfg of a cell including a UL SF superset between a monitoring cell (MCell) and the corresponding SCell when cross-CC scheduling is set. The MCell refers to a scheduling cell with respect to the corresponding SCell and includes a PCell or an SCell.

For example, when a PCell operates in UD-cfg #1 and an SCell operates in UD-cfg #3 on the basis of UD-cfg (refer to Table 1), DL ref-cfg set for the SCell may be set to UD-cfg #4 having the smallest number of DL SFs between UD-cfg #4/5 in which all SF #0/4/5/6/7/8/9 corresponding to a DL SF union of the PCell and the SCell are configured as DL SFs. Accordingly, a DL HARQ timing defined in UD-cfg #4 may be applied to PDSCH transmission in the SCell (refer to FIGS. 5 and 6 and Table 4). As another example, when an SCell operates in UD-cfg #2 and an MCell set in the SCell operates in UD-cfg #1, UL ref-cfg set for the SCell may be set to UD-cfg #1 set for the MCell in which SF #2/3/7/8 corresponding to a UL SF superset in the MCell and the SCell are all UL SFs. Accordingly, a UL HARQ timing defined in UD-cfg #1 (refer to FIGS. 7 to 10 and Tables 5 to 7) may be applied to PUSCH transmission in the SCell.

More specifically, in 3GPP TS 36.213 V11.11.0 (2015-06) published before the priority date of the present invention, DL ref-cfg and UL ref-cfg when two or more serving cells have different UD-cfgs are defined as follows.

DL ref-cfg
PCell: DL ref-cfg is set to UD-cfg of a PCell.
SCell: DL ref-cfg is set according to (PCell UD-cfg, SCell UD-cfg) as shown in Table 9. Set 1 is applied when cross-/self-CC scheduling is set for an SCell, Set 2 and Set 3 are applied when self-CC scheduling is set for the SCell, and Set 4 and Set 5 are applied when cross-CC scheduling is set for the SCell. Table 9 corresponds to 3GPP TS 36.213 V11.11.0 Table 10.2-1.

TABLE 9

| Set # | (Primary cell UL/DL configuration, Secondary cell UL/DL configuration) | DL-reference UL/DL configuration |
|---|---|---|
| Set 1 | (0, 0) | 0 |
| | (1, 0), (1, 1), (1, 6) | 1 |
| | (2, 0), (2, 2), (2, 1), (2, 6) | 2 |
| | (3, 0), (3, 3), (3, 6) | 3 |
| | (4, 0), (4, 1), (4, 3), (4, 4), (4, 6) | 4 |
| | (5, 0), (5, 1), (5, 2), (5, 3), (5, 4), (5, 5), (5, 6) | 5 |
| | (6, 0), (6, 6) | 6 |

TABLE 9-continued

| Set # | (Primary cell UL/DL configuration, Secondary cell UL/DL configuration) | DL-reference UL/DL configuration |
|---|---|---|
| Set 2 | (0, 1), (6, 1) | 1 |
| | (0, 2), (1, 2), (6, 2) | 2 |
| | (0, 3), (6, 3) | 3 |
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 | (3, 1), (1, 3) | 4 |
| | (3, 2), (4, 2), (2, 3), (2, 4) | 5 |
| Set 4 | (0, 1), (0, 2), (0, 3), (0, 4), (0, 5), (0, 6) | 0 |
| | (1, 2), (1, 4), (1, 5) | 1 |
| | (2, 5) | 2 |
| | (3, 4), (3, 5) | 3 |
| | (4, 5) | 4 |
| | (6, 1), (6, 2), (6, 3), (6, 4), (6, 5) | 6 |
| Set 5 | (1, 3) | 1 |
| | (2, 3), (2, 4) | 2 |
| | (3, 1), (3, 2) | 3 |
| | (4, 2) | 4 |

UL ref-cfg
When a serving cell is a PCell or is not scheduled from other serving cells (that is, cross-CC scheduling is not set for an SCell), UL ref-cfg of the corresponding serving cell is set to UD-cfg of the corresponding serving cell.
When a serving cell is an SCell and is scheduled from other serving cells (that is, cross-CC scheduling is set for the SCell), UL ref-cfg is set according to (other serving cell UD-cfg, SCell UD-cfg) as shown in Table 10. Table 10 corresponds to 3GPP TS 36.213 V11.11.0 Table 8-0A.

TABLE 10

| Set # | (other serving cell UL/DL configuration, serving cell UL/DL configuration) | UL-reference UL/DL configuration |
|---|---|---|
| Set 1 | (1, 1), (1, 2), (1, 4), (1, 5) | 1 |
| | (2, 2), (2, 5) | 2 |
| | (3, 3), (3, 4), (3, 5) | 3 |
| | (4, 4), (4, 5) | 4 |
| | (5, 5) | 5 |
| Set 2 | (1, 0), (2, 0), (3, 0), (4, 0), (5, 0) | 0 |
| | (2, 1), (4, 1), (5, 1) | 1 |
| | (5, 2) | 2 |
| | (4, 3), (5, 3) | 3 |
| | (5, 4) | 4 |
| | (1, 6), (2, 6), (3, 6), (4, 6), (5, 6) | 6 |
| Set 3 | (3, 1) | 1 |
| | (3, 2), (4, 2) | 2 |
| | (1, 3), (2, 3) | 3 |
| | (2, 4) | 4 |
| Set 4 | (0, 0), (6, 0) | 0 |
| | (0, 1), (0, 2), (0, 4), (0, 5), (6, 1), (6, 2), (6, 5) | 1 |
| | (0, 3), (6, 3) | 3 |
| | (6, 4) | 4 |
| | (0, 6), (6, 6) | 6 |

Meanwhile, when PUCCH transmission to an ACell is set, cells constituting CA may be divided into two cell groups (CGs), one CG may include a PCell and the other CG may include the ACell. For convenience, the CG including the PCell is defined as a primacy CG (PCG) and the CG including the ACell is defined as a secondary CG (SCG). One cell can be included in only one CG. That is, one cell is not included in a plurality of CGs. Accordingly, UCI PUCCH transmission to all cells included in the PCG may be performed through the PCell and UCI PUCCH transmission to all cells included in the SCG may be performed through the ACell. In addition, cross-CC scheduling may be set only between cells in each CG. That is, cross-CC scheduling is not set between cells belonging to different CGs. In this situation, when the PCell and the ACell have different UD-cfgs and a UE operates in HD, transmission and reception in some SFs (e.g., SFs having a different transmission direction from SFs of the PCell) in the ACell may be restricted due to HD operation which prioritizes the SF configuration in the PCell. Accordingly, DL/UL control signaling (e.g., UCI PUCCH transmission) through the ACell may also be restricted.

To solve this problem, a DL/UL HARQ timing setting method suitable when a UE operates on the basis of HD in a situation in which different UD-cfgs have been set for a PCell and an ACell is proposed. Specifically, a DL/UL timing setting method for PDSCH/PUSCH transmission in an ACell and a normal SCell belonging to an SCG is proposed. Hereinafter, a UD-cfg having the smallest number of DL SFs among UD-cfgs including a DL SF union of cell 1 and cell 2 is defined as a DL union (DL ref-cfg, Table 9), and a UD-cfg of a cell including a UL SF superset between cell 1 and cell 2 is defined as a UL superset (UL ref-cfg, Table 10).

1) DL HARQ Timing Setting for PDSCH Transmission

A. In the case of the ACell: A HARQ timing defined in a DL union of a PCell and the ACell is applied. That is, a HARQ timing of the ACell is determined by replacing (PCell UD-cfg, SCell UD-cfg) with (PCell UD-cfg, ACell UD-cfg) in Table 9.

B. In the case of the normal SCell in the SCG i. When cross-CC scheduling is not set: A HARQ timing defined in {the DL union of the PCell and the ACell} and a DL union of the SCell is applied. That is, the HARQ timing of the ACell is determined by replacing (PCell UD-cfg, SCell UD-cfg) with (PCell UD-cfg, ACell UD-cfg) in Table 9 and a HARQ timing of the SCell is determined by replacing (PCell UD-cfg, SCell UD-cfg) with (ACell DL ref-cfg, SCell UD-cfg) in Table 9.

ii. When cross-CC scheduling is set: The HARQ timing defined in the DL union of the PCell and the ACell is applied. That is, the HARQ timing of the SCell is determined by replacing (PCell UD-cfg, SCell UD-cfg) with (PCell UD-cfg, ACell UD-cfg) in Table 9.

2) UL HARQ Timing Setting for PUSCH Transmission

A. In the case of the ACell: A HARQ timing defined in a UL superset of the PCell and the ACell is applied. That is, the HARQ timing of the ACell is determined by replacing (other serving cell UD-cfg, serving cell UD-cfg) with (PCell UD-cfg, ACell UD-cfg) in Table 10.

B. In the case of the normal SCell in the SCG i. When cross-CC scheduling is not set: A HARQ timing defined in the UD-cfg of the SCell is applied.

ii. When cross-CC scheduling is set: A HARQ timing defined in {the UL superset of the PCell and the ACell} and the UL superset of the SCell is applied. That is, the HARQ timing of the ACell is determined by replacing (other serving cell UD-cfg, serving cell UD-cfg) with (PCell UD-cfg, ACell UD-cfg) in Table 10 and the HARQ timing of the SCell is determined by replacing (other serving cell UD-cfg, serving cell UD-cfg) with (ACell UL ref-cfg, SCell UD-cfg) in Table 10.

Figure 14:
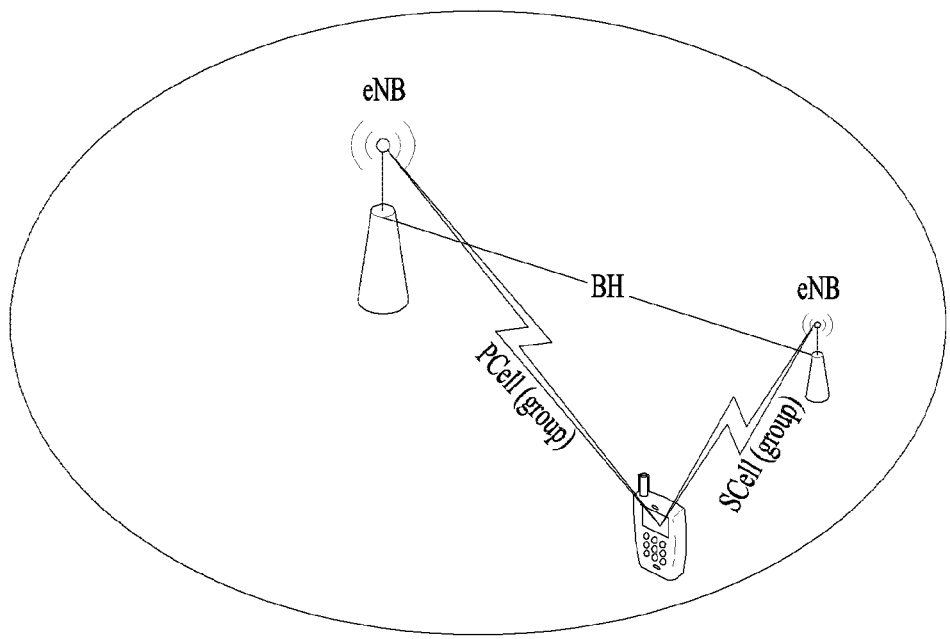
FIG. 14 illustrates HARQ timing setting according to the present invention.

FIG. 14 illustrates HARQ timing setting according to the present invention. Referring to FIG. 14, a PCell group (i.e., PCG) and an SCell group (i.e., SCG) may be configured. The PCell group is composed of a single PCell and zero or more SCells and the SCell group is composed of one or more SCells. A specific SCell (i.e., ACell) in the SCell group may be configured to transmit a PUCCH. The example illustrates a case in which the SCell group has two serving cells (i.e., ACell and SCell). In the present embodiment, it is assumed that the PCell, the ACell and the SCell (or SCells) respectively have UD-cfg a, UD-cfg b and UD-cfg c and UD-cfg a differs from UD-cfg b. When HD operation is applied in this situation, signal transmission and reception on the ACell are restricted according to the subframe configuration of the PCell and thus the HARQ timing with respect to the SCell (or SCells) in the SCell group is also affected by the subframe configuration of the PCell. Specifically, the HARQ timing with respect to the SCell (or SCells) in the SCell group is determined in consideration of the DL union/UL superset of the PCell and the ACell, as described above.

Additionally, FIG. 14 illustrates inter-site CA. Here, an eNB which manages PCells may take charge of radio resource control and management (e.g., all functions of RRC and some functions of MAC) with respect to UEs and an eNB which manages each cell may take charge of data scheduling and feedback (e.g., all functions of PHY and main functions of MAC) with respect to each cell. Accordingly, information/data exchange/delivery between cells (i.e., between eNBs) is required in inter-site CA. When conventional signaling methods are considered, information/data exchange/delivery between cells (i.e., between eNBs) in inter-site CA may be performed through backhaul (BH) (e.g., a wired X2 interface or a wireless backhaul link).

Method 2: UCI PUCCH Transmission Cell Switching

In the case of CA of cells with different SF configurations (e.g., CA of different UD-cfgs, CA of an FDD cell and a TDD cell) in legacy systems, a UCI (e.g., CSI) PUCCH including A/N for PDSCH transmission in an SCell may be defined to be transmitted only to a PCell or an ACell all the time. A DL HARQ timing with respect to PDSCH transmission in a Cell may be set depending on the SF configuration (e.g., UD-cfg and a duplexing scheme (FDD or TDD)) of the PCell/ACell.

On the contrary, the present embodiment proposes a method of applying a DL HARQ timing defined in the UD-cfg or duplexing scheme of an SCell to PDSCH transmission in the SCell and changing cells in which A/N PUCCH transmission is performed according to SF as follows. The method described below may be applied per CG.

1) In the Case of an SF in which Only One Cell is Configured for UL

A. Only A/N for the corresponding cell is transmitted through a PUCCH (e.g., PF1) on the corresponding cell.

B. In this case, a TPC command for PUCCH power control is signaled through a DL grant which schedules the corresponding cell.

2) In the Case of an SF in which Multiple Cells are Simultaneously Configured for UL A. A/N for all of the multiple cells is transmitted through a PUCCH (e.g., PF3) on a specific one (referred to as a representative cell (RCell)) of the multiple cells.

B. A TPC command for PUCCH power control is signaled through a DL grant which schedules the RCell among the multiple cells, and an ARI indicating PUCCH resources is signaled through a DL grant which schedules the remaining cells other than the RCell.

C. The RCell may be set to a cell having the lowest cell index among the multiple cells or directly set by an eNB (though an RRC signal or the like).

Additionally, in the case of periodic CSI transmission through a PUCCH, A/N may be replaced by periodic CSI and the proposed method may be equally applied thereto in a state in which a periodic CSI transmission timing has been set per cell (according to the UL SF timing of the corresponding cell). For example, only CSI with respect to a cell may be transmitted through a PUCCH on the cell in an SF in which only the cell is configured for UL, whereas all or some CSI with respect to multiple cells may be transmitted through a PUCCH on an RCell in an SF in which the multiple cells are configured for UL. In addition, in the case of SR transmission through a PUCCH, cells in which SR PUCCH transmission is performed may be changed according to SF through a method similar to the aforementioned method in a state in which an SR transmission timing has been set per cell (according to the UL SF timing of the corresponding cell).

Figure 15:
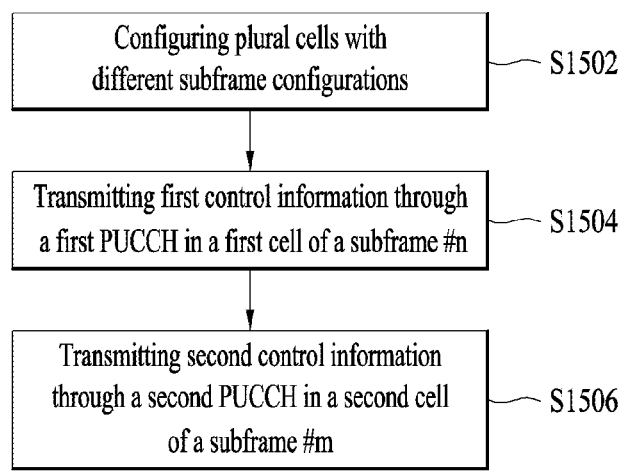
FIG. 15 illustrates uplink signal transmission according to the present invention.

FIG. 15 illustrates uplink signal transmission according to the present invention. Referring to FIG. 15, a UE may configure a plurality of cells with different subframe configurations (S1502). Configuration of a plurality of cells with different subframe configurations includes CA of different UD-cfgs and CA of an FDD cell and a TDD cell. Subsequently, the UE may transmit first control information through a first PUCCH in a first cell of a subframe #n (S1504). In addition, the UE may transmit second control information through a second PUCCH in a second cell of a subframe #m (S1506). Here, the first cell may be a cell in which a transmission direction is configured as uplink in subframe #n, the second cell may be a cell in which a transmission direction is configured as uplink in subframe #m, and the second cell may differ from the first cell. The subframe #n and the subframe #m are different subframes, and n and m are integers equal to or greater than 0 and indicate subframe indexes.

In addition, when there is a single cell in which a transmission direction is configured as uplink in subframe #n, the first control information may include only uplink control information about the single cell. When there are multiple cells in which a transmission direction is configured as uplink in subframe #n, the first control information may include uplink control information about the multiple cells. Furthermore, when there is a single cell in which a transmission direction is configured as uplink in subframe #n, the first PUCCH may be transmitted on the single cell. When there are multiple cells in which a transmission direction is configured as uplink in subframe #n, the first PUCCH may be transmitted on a specific one of the multiple cells. The specific cell may be a cell having the lowest cell index among the multiple cells. Further, when there is a single cell in which a transmission direction is configured as uplink in subframe #n, a downlink grant which schedules the cell may include power control information for the first PUCCH. When there are multiple cells in which a transmission direction is configured as uplink in subframe #n, a downlink grant which schedules the specific cell may include power control information for the first PUCCH and a downlink grant which schedules cells other than the specific cell among the multiple cells may include information indicating a resource of the first PUCCH. The first control information and the second control information may include HARQ-ACK information with respect to DL signals.

Figure 16:
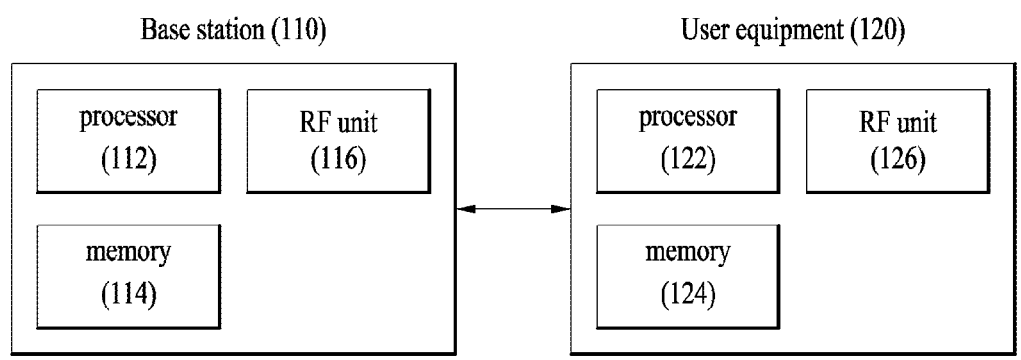
FIG. 16 illustrates a base station (BS) and a user equipment (UE) applicable to an embodiment of the present invention.

FIG. 16 illustrates a BS and a UE applicable to an embodiment of the present invention. When a wireless communication system includes a relay, communication is performed between a BS and the relay on a backhaul link and between the relay and a UE on an access link. The BS or UE shown in the figure can be replaced by a relay as necessary.

Referring to FIG. 16, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method of transmitting uplink signals by a user equipment (UE) in a wireless communication system supporting carrier aggregation, comprising:
configuring multiple cells having different subframe configurations, wherein the multiple cells includes a first cell group including a primary cell and a second cell group including a first cell and a second cell;
transmitting, in the first cell in a subframe #n, first control information through a first physical uplink control channel (PUCCH); and
transmitting, in the first cell in a subframe #m, second control information through a second PUCCH,
wherein the first cell is a cell in which a transmission direction is configured as uplink in the subframe #n and the subframe #m, the second cell being different from the first cell, and
wherein the subframe #n is an uplink subframe related to a set of a smallest number of downlink subframes based on the subframe configurations of the first cell and the primary cell, and
wherein the subframe #m is an uplink subframe related to a set of a smallest number of downlink subframes based on the subframe configurations of the first cell, the second cell and the primary cell.

2. The method according to claim 1, wherein, based on a single cell in which a transmission direction being configured as uplink in the subframe #n, the first control information includes only uplink control information about the single cell, and
based on multiple cells in which a transmission direction being configured as uplink in the subframe #n, the first control information includes uplink control information about the multiple cells.

3. The method according to claim 1, wherein, based on a single cell in which a transmission direction being configured as uplink in the subframe #n, the first PUCCH is transmitted on the single cell, and
based on multiple cells in which a transmission direction being configured as uplink in the subframe #n, the first PUCCH is transmitted on a specific cell of the multiple cells.

4. The method according to claim 3, wherein the specific cell is a cell having a lowest cell index among the multiple cells based on the multiple cells in which the transmission direction being configured as uplink in the subframe #n.

5. The method according to claim 3, wherein, based on the single cell in which the transmission direction being configured as uplink in the subframe #n, a downlink grant which schedules the single cell includes power control information for the first PUCCH.

6. The method according to claim 5, wherein, based on the multiple cells in which the transmission direction being configured as uplink in the subframe #n, a downlink grant which schedules the specific cell includes power control information for the first PUCCH and a downlink grant which schedules cells other than the specific cell among the multiple cells includes information for a resource of the first PUCCH.

7. The method according to claim 1, wherein the first control information and the second control information include hybrid ARQ acknowledgement (HARQ-ACK) information.

8. A user equipment (UE) configured to transmit uplink signals in a wireless communication system supporting carrier aggregation, comprising:
a radio frequency (RF) unit; and
a processor,
wherein the processor is configured to:
configure multiple cells having different subframe configurations, wherein the multiple cells includes a first cell group including a primary cell and a second cell group including a first cell and a second cell; and
transmit, in the first cell in a subframe #n, first control information through a first physical uplink control channel (PUCCH) and to transmit, in a first cell in a subframe #m, second control information through a second PUCCH,
wherein the first cell is a cell in which a transmission direction is configured as uplink in the subframe #n and the subframe #m, the second cell being different from the first cell,
wherein the subframe #n is an uplink subframe related to a set of a smallest number of downlink subframes based on the subframe configurations of the first cell and the primary cell, and
wherein the subframe #m is an uplink subframe related to a set of a smallest number of downlink subframes based on the subframe configurations of the first cell, the second cell and the primary cell.

9. The UE according to claim 8, wherein, based on a single cell in which a transmission direction being configured as uplink in the subframe #n, the first control information includes only uplink control information about the single cell, and
based on multiple cells in which a transmission direction being configured as uplink in the subframe #n, the first control information includes uplink control information about the multiple cells.

10. The UE according to claim 8, wherein, based on a single cell in which a transmission direction being configured as uplink in the subframe #n, the first PUCCH is transmitted on the single cell, and
based on multiple cells in which a transmission direction being configured as uplink in the subframe #n, the first PUCCH is transmitted on a specific cell of the multiple cells.

11. The UE according to claim 10, wherein the specific cell is a cell having a lowest cell index among the multiple cells based on the multiple cells in which the transmission direction being configured as uplink in the subframe #n.

12. The UE according to claim 10, wherein, based on the single cell in which the transmission direction being configured as uplink in the subframe #n, a downlink grant which schedules the single cell includes power control information for the first PUCCH.

13. The UE according to claim 12, wherein, based on the multiple cells in which the transmission direction being configured as uplink in the subframe #n, a downlink grant which schedules the specific cell includes power control information for the first PUCCH and a downlink grant which schedules cells other than the specific cell among the multiple cells includes information for a resource of the first PUCCH.

14. The UE according to claim 8, wherein the first control information and the second control information include hybrid ARQ acknowledgement (HARQ-ACK) information.

* * * * *